July 10, 1928.
J. E. FUNK
1,676,646
SUPPORTING AND INCLOSING STRUCTURE FOR GROUND WORKING IMPLEMENTS
Original Filed Sept. 27, 1926    2 Sheets-Sheet 2
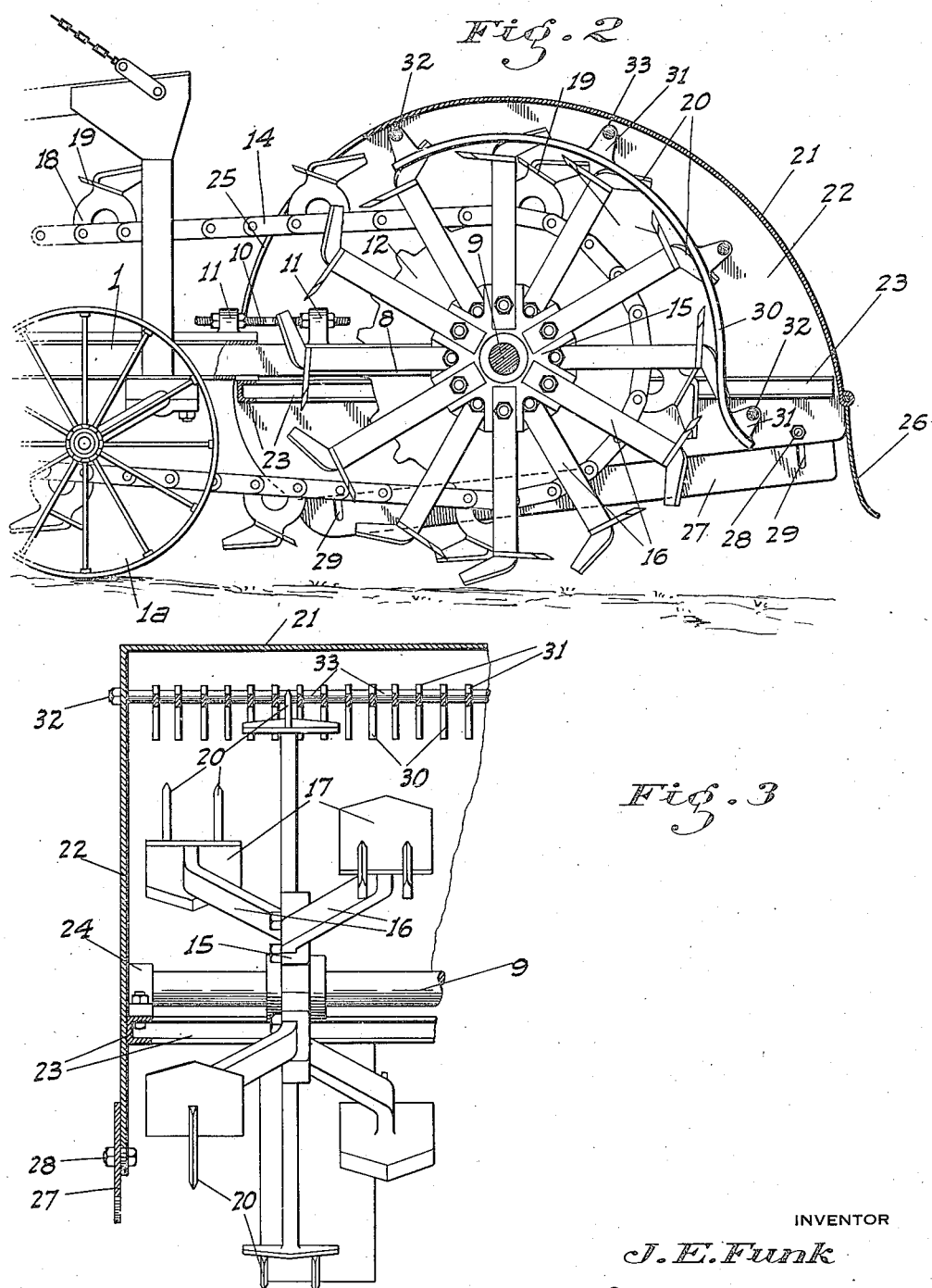
INVENTOR
J. E. Funk
BY
ATTORNEY Patented July 10, 1928.

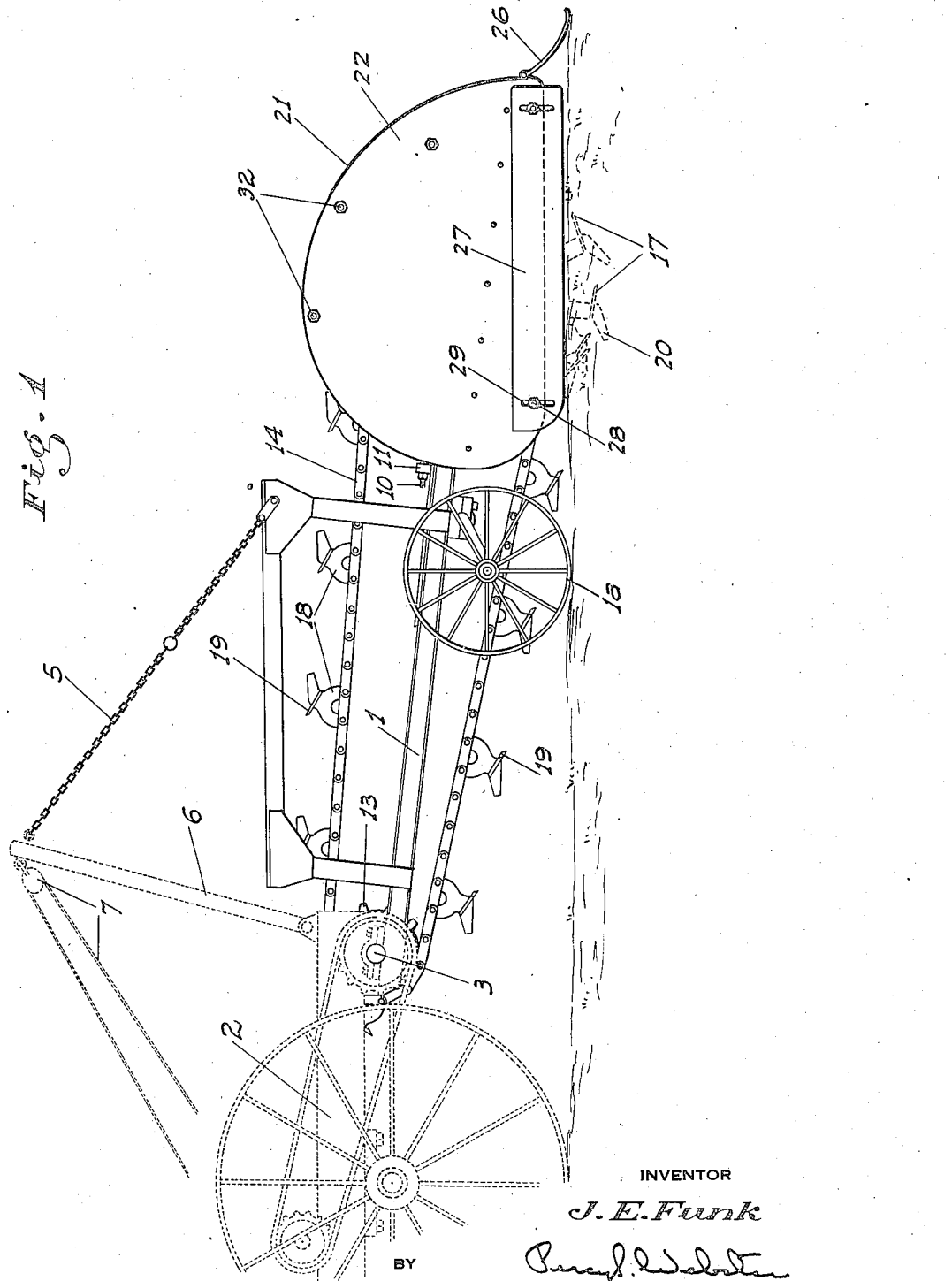

1,676,646

UNITED STATES PATENT OFFICE.

JOHN E. FUNK, OF STOCKTON, CALIFORNIA, ASSIGNOR TO FUNK SOIL PULVERIZER COMPANY, OF STOCKTON, CALIFORNIA, A CORPORATION.

SUPPORTING AND INCLOSING STRUCTURE FOR GROUND-WORKING IMPLEMENTS.

Original application filed September 27, 1926, Serial No. 137,884. Divided and this application filed April 11, 1927. Serial No. 182,601.

This invention relates to improvements in rotary ground working implements and particularly represents a division of my copending application for patent on a ground working implement, Serial No. 137,884, filed September 27th, 1926.

The principal objects of the present invention are to provide a housing structure for inclosing the rotary ground cutting unit of the machine so arranged as to prevent clods as they are cut or dug from being thrown away from the definite ground area being worked on and to prevent dissemination of the dust from the pulverized dirt into the surrounding atmosphere; to cause all clods not thoroughly broken up by the initial engagement of the cutters with the ground to be again acted on and to cause all such clods as may still remain practically intact to be delivered onto the ground ahead of the path of movement of the machine.

A further object of the invention is to produce a simple and inexpensive device and yet one which will be exceedingly effective for the purpose for which it is designed.

These objects I accomplish by means of such structure and relative arrangement of parts as will fully appear by a perusual of the following specification and claims.

In the drawings similar characters of reference indicate corresponding parts in the several views.

Fig. 1 is a side elevation of the complete ground working implement showing my inclosing housing as applied in connection with the rotary ground working unit.

Fig. 2 is a sectional elevation of the housing structure showing the positioning of the rotating cutting unit relative thereto.

Fig. 3 is a fragmentary transverse section of the housing and the adjacent portion of the rotary ground working unit.

Referring now more particularly to the characters of reference on the drawings, the machine to which my improved housing structure is applied comprises essentially a boom structure 1 arranged to extend rearwardly of a pull or draft implement 2 of any suitable character. The boom at its forward end has a transverse shaft 3 which is turnably mounted on the boom and on the frame 4 of the implement 2. To the rear end of the boom is applied a raising and lowering means, here shown as a chain 5 extending to derrick arms 6 pivoted on the frame 4, with a block and tackle mechanism, as indicated at 7, extending from the forward ends of the arms and connected to the implement 2 to be manipulated therefrom. The boom may be supported by this raising mechanism or by vertically adjustable ground bearing wheels 1ª mounted adjacent the rear end of the boom.

Slidably mounted in and projecting rearwardly from the boom is an extension 8 which at its rear end turnably supports a transverse shaft 9. This extension is mounted for longtudinal adjustment in the boom, so as to shift the shaft back and forth, by suitable means such as a longitudinal bolt 10 engaging lugs 11 projecting outwardly from the boom and extension.

Fixed centrally on said shaft is a sprocket wheel 12, while fixed on the shaft 3 in longitudinal alinement with said sprocket wheel 12 is another sprocket wheel 13, an endless driving chain 14 of substantial character passing about said sprockets. The shaft 3 is driven in any suitable manner, and in that direction which will cause the lower periphery of the chain to travel opposite to the direction of movement of the implement as a whole, or in other words in the same direction as the supporting wheels of the draft implement.

Fixed on the shaft 9 on each side of the sprocket wheel 12 in spaced relation thereto and to each other are spiders 15 each having a plurality of radial arms 16 projecting outwardly therefrom. On the outer ends of these arms which are longer than the radius of the sprocket wheel 12 are fixed transversely extending blades in the form of flat plates 17 which are disposed substantially at right angles to the radial plane of the arms and are all the same distance from the shaft.

At intervals the links of the chain 14 carry outwardly projecting arch brackets 18 on which are mounted transversely extending blades 19 corresponding in form to the blades 17, which are disposed at a suitable forward slant to the ground in the direction of the ground engaging movement, and are sharpened on their forward edges. These blades lie in a transverse plane between the plane of the adjacent spider blades, and when passing around the sprocket wheel 12 are disposed so as to lie in a circumferential plane between an adjacent pair of blades 17, as shown in Fig. 2. The number of links in the chain, the number of teeth in the sprocket wheel 12, and the number of blades on the chain are so proportioned that said blades 19 always assume the above named positions relative to the blades 17. The spider arms are so disposed that the blades 17 on their outer ends are arranged in alternately offset relation transversely of each other, particularly as set forth in the above mentioned co-pending application.

Each plate 17 has one or more longitudinally extending fins 20 projecting from the outer face of the blade in a transverse plane at right angles thereto, and extending rearwardly relative to the direction of movement of the blades. These fins on the various blades are disposed so that the spaces between all the fins transversely of the machine will be equal.

The speed of rotation of the digging structure is considerably in excess of the speed of advancing movement of the machine, and with such rotation the dirt is thrown upwardly and rearwardly, and with certain kinds of dirt clouds of fine dust are formed and thrown into the air. To catch the dirt and dust I inclose that portion of the digging structure which is always above ground by a hood having a curved top portion 21 and vertical sides 22. This hood structure is rigidly supported in connection with the digging structure, so as to move with the same when the member 8 is adjusted relative to the boom, by suitable means such as a beam 23 bent to form side portions outwardly of the outermost blades 17 and supported from the shaft by bearings 24 thereon; and a transverse portion connected to the extension member 8 ahead of the digging structure. The top member of the hood at the front above the beam is vertically slotted as at 25 to allow the chain and its blades to pass therethrough; and below the beam is open all the way across between the sides. A transverse apron 26 is hinged onto the hood member 22 at its rear end, so as to rest on and drag along the ground when the digging members are lowered to their operative position. This apron prevents any dust from being thrown rearwardly between the bottom of the hood and ground, and as well acts to smooth out the ground already acted on by the digging structure.

In order to enable the hood protection to be afforded to a point very close to the ground regardless of the depth to which the digging structure is set I mount vertically adjustable side plates 27 onto the sides 22 of the hood. These plates are held in position by bolts 28 secured to said sides 22 and passing through vertical slots 29 provided in the plates.

With the operation of the digging structure, it sometimes happens that the clods are not thoroughly broken up by the passage of the different blades through the earth, and are whirled rearwardly and upwardly along with the dust, being then caught by the hood and thrown forwardly of the same to drop onto the ground ahead of the digging structure. Such clods would therefore be very liable to be again engaged by the blades and thoroughly broken up. To cause such clods, however, to be preferably cut up during their movement inside the hood, I mount a plurality of transversely spaced bars 30 which are disposed concentric with the shaft 9 between the blades 17 and the top of the hood, and positioned so that the various fins 20 pass between the bars. It will therefore be seen that any clods deflected from the hood and resting on and extending across adjacent bars will be cut through by the fins as they pass between said bars. These bars at their rear ends terminate at a point somewhat above the normal ground level, so as not to interfere with the throwing up movement of the clods to engage the hood. These bars have outwardly projecting lugs 31 at spaced intervals, through which bolts 32 extend to the sides of the hood, with spacers 33 on said bolts between the lugs, so as to maintain the bars in properly spaced relation. This arrangement enables the fins to project through and beyond the bars without danger of the bar securing means being engaged by the fins.

The extension 8 being adjustable the driving chain may be maintained at the proper tension at all times. The hood structure being mounted in fixed connection with the extension and the rotary digging unit the bars in the hood will always be maintained in the same alinement relative to the digging blades and fins so that the parts will always function properly.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A ground working implement including a boom structure, means for supporting and holding the rear end of the boom at different distances from the ground, a rotary ground working unit mounted on the rear end of the boom, a hood having side members mounted in fixed connection with the unit and inclosing the upper portion of the same, and vertically adjustable plates along the sides of the hood at their lower ends.

2. In a ground working implement, a ground working unit, a hood over the upper portion of said unit and an apron hinged along the rear lower edge of the hood to rest freely on the ground at a rearward angle when the unit is engaged with the ground.

3. In a ground working implement, a rotary ground working unit which includes longitudinal cutting fins projecting outwardly therefrom and arranged in concentric alinement, and transversely spaced bars disposed concentric with said fins and fixed relative thereto, said bars having their inception at the rear end of the unit a certain distance above the bottom arc of the movement of the fins and extending thence upwardly, the fins projecting between the bars with the rotation of the unit.

4. In a ground working implement, a rotary ground working unit which includes cutting fins projecting outwardly therefrom, transversely spaced bars to receive the fins to be mounted in connection with the unit, and a curved hood disposed outwardly of the bars in spaced relation thereto and to which said bars are connected.

5. In connection with a rotary ground working unit having cutting fins projecting outwardly therefrom, a hood partially surrounding said unit and transversely space bars to receive the fins therebetween mounted in the hood; means for securing the bars in the hood, such means comprising lugs projecting outwardly from the bars at intervals, and bolts through the lugs secured in the sides of the hood.

6. A structure as in claim 4 in which the rear end of the hood terminates at a level lower than the adjacent ends of the bars, whereby to cause any clods thrown up by the revolution of the unit to pass between the hood and bars.

In testimony whereof I affix my signature.

JOHN E. FUNK.